(12) United States Patent
Kwon et al.

(10) Patent No.: US 8,902,386 B2
(45) Date of Patent: Dec. 2, 2014

(54) LIQUID CRYSTAL DISPLAY

(75) Inventors: Oh Jeong Kwon, Hwaseong-si (KR); Jae Hong Park, Seoul (KR); Sung-Jae Yun, Hwaseong-si (KR); Hyeok Jin Lee, Seongnam-si (KR); Mee Hye Jung, Suwon-si (KR); Jiang Shuai, Yongin-si (KR); Kyung Hye Park, Seongnam-si (KR); Jae-Hoon Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 59 days.

(21) Appl. No.: 13/462,084

(22) Filed: May 2, 2012

(65) Prior Publication Data

US 2012/0281173 A1 Nov. 8, 2012

Related U.S. Application Data

(60) Provisional application No. 61/481,677, filed on May 2, 2011.

(30) Foreign Application Priority Data

May 24, 2011 (KR) ........................ 10-2011-0049111

(51) Int. Cl.
*G02F 1/1337* (2006.01)
*G02F 1/1343* (2006.01)
*G02F 1/1334* (2006.01)

(52) U.S. Cl.
CPC *G02F 1/133707* (2013.01); *G02F 2001/13345* (2013.01); *G02F 1/133788* (2013.01); *G02F 2001/133757* (2013.01); *G02F 2001/134318* (2013.01); *G02F 2001/133742* (2013.01)
USPC .......................................... 349/129; 349/139

(58) Field of Classification Search
USPC ................................................ 349/129, 139
See application file for complete search history.

(56) References Cited

U.S. PATENT DOCUMENTS

| | | |
|---|---|---|
| 5,309,264 A | 5/1994 | Lien et al. |
| 6,825,892 B2 | 11/2004 | Nagaoka et al. |
| 6,894,741 B2 | 5/2005 | Nakanishi et al. |
| 7,113,241 B2 | 9/2006 | Hanaoka |
| 7,136,119 B2 | 11/2006 | Inoue et al. |
| 7,169,449 B2 | 1/2007 | Nakanishi et al. |
| 7,324,175 B2 | 1/2008 | Inoue et al. |

(Continued)

OTHER PUBLICATIONS

European Search Report for corresponding EP Application No. 12165902.3-2205 dated Aug. 17, 2012.

(Continued)

*Primary Examiner* — Nathanael R Briggs
(74) *Attorney, Agent, or Firm* — H.C. Park & Associates, PLC

(57) ABSTRACT

A liquid crystal display according to an exemplary embodiment of the present invention includes a first substrate, a pixel electrode disposed on the first substrate, a first alignment layer disposed on the first substrate and the pixel electrode, a second substrate facing the first substrate, a common electrode disposed on the second substrate, a second alignment layer disposed on the second substrate and the common electrode, and a liquid crystal layer disposed between the first substrate and the second substrate, in which the common electrode has a first opening having a cross shape, an edge of the first opening protrudes beyond an edge of the pixel electrode, and the pixel electrode includes a second opening disposed adjacently to at least one of the edges of the pixel electrode.

22 Claims, 14 Drawing Sheets

(56) References Cited

U.S. PATENT DOCUMENTS

| | | |
|---|---|---|
| 7,359,028 B2 | 4/2008 | Makimoto et al. |
| 7,508,385 B2 | 3/2009 | Ueda et al. |
| 2004/0070714 A1* | 4/2004 | Ishii et al. .................... 349/129 |
| 2005/0162598 A1* | 7/2005 | Choi et al. .................... 349/139 |
| 2010/0007834 A1* | 1/2010 | Song et al. .................... 349/129 |
| 2011/0001691 A1 | 1/2011 | Hashimoto et al. |

OTHER PUBLICATIONS

Notice of Allowance dated Apr. 21, 2014 in U.S. Appl. No. 13/460,667.

* cited by examiner

FIG.8
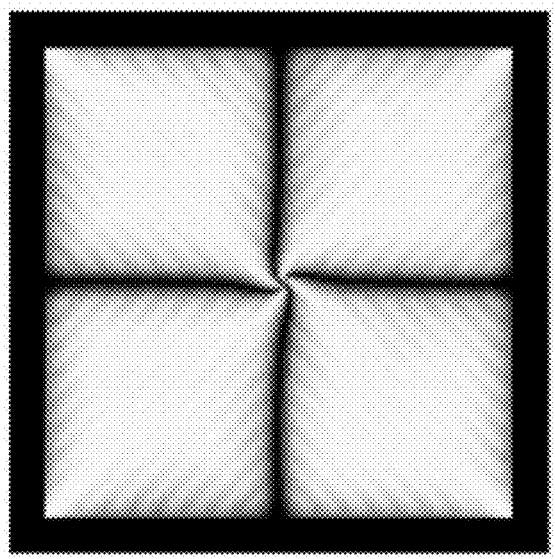
(a)
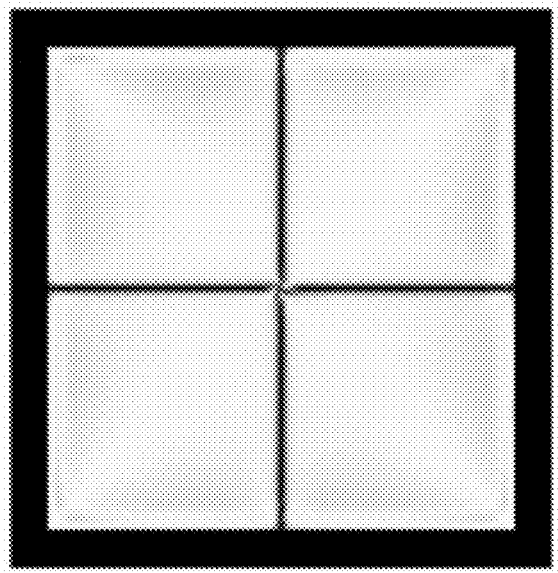
(b)

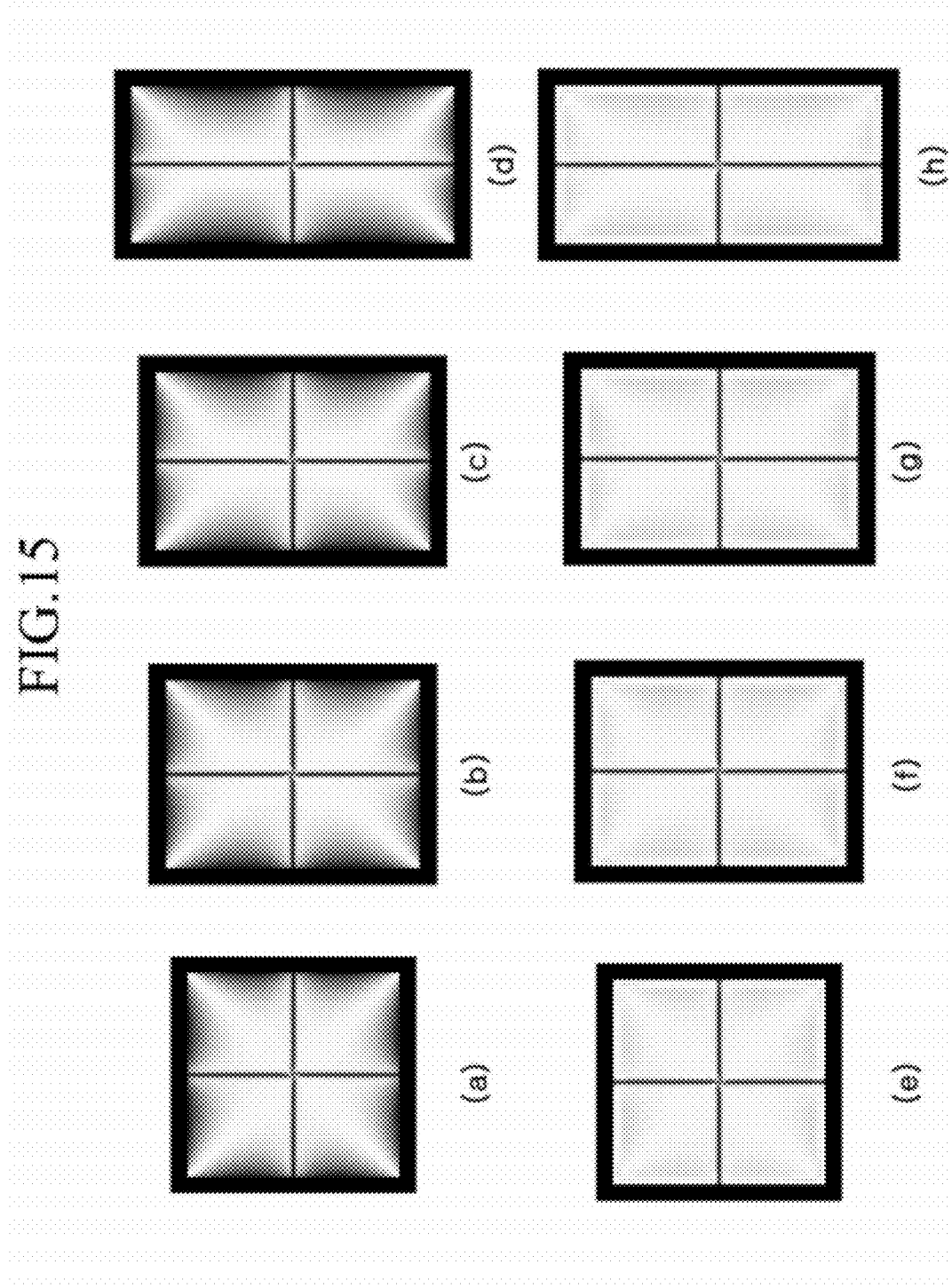

LIQUID CRYSTAL DISPLAY

CROSS-REFERENCE TO RELATED APPLICATION

This application claims priority to and the benefits of U.S. Patent Application No. 61/481,677 filed in the USPTO on May 2, 2011 and Korean Patent Application No. 10-2011-0049111 filed in the Korean Intellectual Property Office on May 24, 2011, the entire contents of which are incorporated herein by reference.

BACKGROUND

1. Field

The following description relates to a liquid crystal display.

2. Discussion of the Background

A liquid crystal display, which may be one of the more common types of flat panel displays currently in use, may include two sheets of display panels with field generating electrodes, such as a pixel electrode and a common electrode, etc., and a liquid crystal layer interposed therebetween. The liquid crystal display generates electric fields in the liquid crystal layer by applying voltage to the field generating electrodes, and determines the direction of liquid crystal molecules of the liquid crystal layer by the generated electric field, thus controlling polarization of incident light so as to display images.

Among the liquid crystal displays, a vertically aligned (VA) mode liquid crystal display, where liquid crystal molecules may be aligned so that a long axis thereof is vertical to the display panel in a state where no electric field is applied, has been developed.

In the VA mode liquid crystal display, a method for forming a cutout or an opening, such as a micro-slit on the field generating electrode, may be used to ensure a light viewing angle. Cutouts and protrusions may determine a tilt direction of liquid crystal molecules, such that a viewing angle may be increased by appropriately disposing the cutouts and protrusions to disperse the tilt direction of the liquid crystal molecule in various directions.

Particularly, in the case of a method for providing a plurality of branch electrodes by forming a micro-slit on a pixel electrode, an open ratio of the liquid crystal display may be decreased.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display having advantages of having a wide viewing angle and a rapid response speed and decreasing an open ratio of the liquid crystal display.

Additional features of the invention will be set forth in the description which follows, and in part will be apparent from the description, or may be learned by practice of the invention.

Exemplary embodiments of the present invention provide a liquid crystal display, including: a first substrate; a pixel electrode disposed on the first substrate; a first alignment layer disposed on the first substrate and the pixel electrode; a second substrate facing the first substrate; a common electrode disposed on the second substrate; a second alignment layer disposed on the second substrate and the common electrode; and a liquid crystal layer disposed between the first substrate and the second substrate, wherein at least one of the pixel electrode and the common electrode has a first opening having a cross shape, an edge of the opening protrudes beyond an edge of the pixel electrode, and the pixel electrode includes a second opening disposed adjacently to at least one of the edges of the pixel electrode.

The second cutout may be disposed to be spaced apart from the edge by about two times or less a thickness of the liquid crystal layer, and a width of the second cutout may be about two times or less the thickness of the liquid crystal layer.

A width of the first cutout may be about three times or less the thickness of the liquid crystal layer.

At least one of the liquid crystal layer, the first alignment layer, and the second alignment layer may include a photoreactive material.

Liquid crystal molecules of the liquid crystal layer may be arranged so as to be almost vertical to surfaces of the first substrate and the second substrate when an electric field is not applied to the liquid crystal layer.

The liquid crystal molecules of the liquid crystal layer may be arranged so as to have a pretilt in a direction that is parallel to a direction toward a central portion of the first cutout from a point meeting the edge of the pixel electrode.

The pixel electrode may be divided into a plurality of subregions by the edge of the pixel electrode and the first cutout, and in the subregion, the liquid crystal molecules of the liquid crystal layer may be arranged so as to have pretilts in different directions.

Exemplary embodiments of the present invention provide a liquid crystal display including a first substrate; a pixel electrode disposed on the first substrate; a common electrode disposed on the second substrate; and a liquid crystal layer including a plurality of liquid crystal molecules disposed between the first substrate and the second substrate; in which the common electrode has a first opening disposed in a central region of the pixel electrode and divides the pixel electrode into a plurality of regions, a portion of the first opening meets an edge of the pixel electrode, the pixel electrode has a second opening disposed adjacently to at least one of the edges of the pixel electrode, and the liquid crystal molecules are disposed on the edges of the pixel electrode and directed towards the central region of the pixel electrode according to an applied electric field.

Exemplary embodiments of the present invention provide a liquid crystal display including a first substrate; a pixel electrode disposed on the first substrate; a common electrode disposed on the second substrate; and a liquid crystal layer disposed between the first substrate and the second substrate; in which the common electrode has a first opening to divide the pixel electrode into a plurality of regions, a portion of the first opening meets an edge of the pixel electrode, and the pixel electrode has a second opening disposed at the edges of the pixel electrode.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 is a plan view illustrating a result of transmittance of a liquid crystal display according to an exemplary embodiment of the present invention.

FIG. 15 is a plan view illustrating a result of transmittance of a liquid crystal display according to an exemplary embodiment of the present invention.

DETAILED DESCRIPTION OF THE ILLUSTRATED EMBODIMENTS

Figure 1:
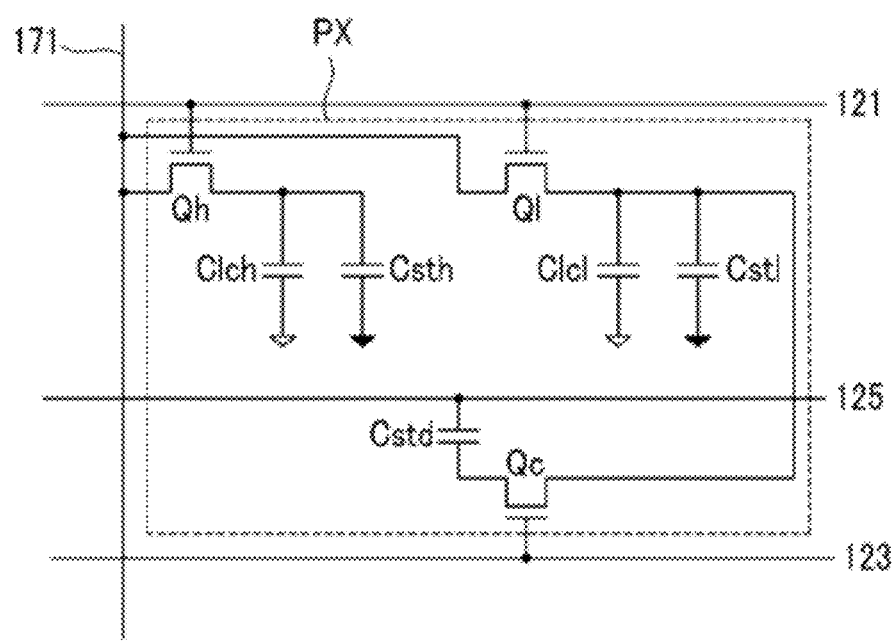
FIG. 1 is a circuit diagram illustrating one pixel of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Further, the invention may be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ).

In the drawings, the thickness of layers, films, panels, regions, etc., are exaggerated for clarity. Like reference numerals designate like elements throughout the specification. It will be understood that when an element, such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an exemplary embodiment of the present invention will be described in brief with reference to FIG. 1. FIG. 1 is a circuit diagram illustrating one pixel of a liquid crystal display according to an exemplary embodiment of the present invention.

With reference to FIG. 1, the liquid crystal display according to an exemplary embodiment of the present invention includes a signal line that includes a gate line 121, a storage electrode line 125, a voltage drop gate line 123, and a data line 171, and a pixel PX that is connected thereto.

The pixel PX includes a first switching element Qh, a second switching element Ql, a third switching element Qc, a first liquid crystal capacitors Clch, a second liquid crystal capacitor Clcl, a first storage capacitor Csth, a second storage capacitor Cstl, and a voltage drop capacitor Cstd. Herein, the first switching element Qh and a first thin film transistor, the second switching element Ql and a second thin film transistor, and the third switching element Qc and a third thin film transistor are designated by the same reference symbols.

The first switching element Qh and the second switching element Ql are connected to the gate line 121 and the data line 171, respectively, and the third switching element Qc is connected to the voltage drop gate line 123.

The first switching element Qh and the second switching element Ql may be a three terminal element, such as a thin film transistor provided in a lower panel. A control terminal thereof may be connected to the gate line 121, an input terminal thereof may be connected to the data line 171, and output terminals thereof may be connected to the first liquid s crystal capacitor Clch, the second liquid crystal capacitor Clcl, the first storage capacitor Csth, and the second storage capacitor Cstl.

The third switching element Qc may be a three terminal element, such as a thin film transistor provided in the lower panel. A control terminal thereof may be connected to the voltage drop gate line 123, an input terminal thereof may be connected to the second liquid crystal capacitor Clcl, and an output terminal thereof may be connected to the voltage drop capacitor Cstd.

The first liquid crystal capacitor Clch and the second liquid crystal capacitor Clcl may be formed by overlapping a first subpixel electrode and a second subpixel electrode, which may be connected to the first switching element Qh, the second switching element Ql, and a is common electrode of an upper panel. The first storage capacitor Csth and the second storage capacitor Cstl may be formed by overlapping a storage electrode, the storage electrode line 125, the first subpixel electrode, and the second subpixel electrode.

The voltage drop capacitor Cstd is connected to the output terminal of the third switching element Qc and the storage electrode line 125, and may be formed by overlapping the storage electrode line 125 and the output terminal of the third switching element Qc, which may be provided in the lower panel with an insulator interposed therebetween.

A method for driving the liquid crystal display illustrated in FIG. 1 will be described.

If a gate on signal is applied to the gate line 121, the first switching element Qh and the second switching element Ql connected thereto may be turned on. Accordingly, the data voltage applied to the data line 171 may be applied to the first subpixel electrode and the second subpixel electrode through the first switching element Qh and second switching element Ql, which may be turned on. In this case, intensities of the data voltages applied to the first subpixel electrode and the second subpixel electrode may be the same or similar as each other. Therefore, the voltages charged in the first liquid crystal capacitor Clch and the second liquid crystal capacitor Clcl may be the same or similar as each other. Thereafter, if a gate off signal is applied to the gate line 121 and a gate on signal is applied to the voltage drop gate line 123, the first switching element Qh and the second switching element Ql may be turned off, and the third switching element Qc may be turned on. Then, electric charges may move from the second subpixel electrode through the third switching element Qc to the voltage drop capacitor Cstd. The voltage charge of the second liquid crystal capacitor Clcl may be lowered and the voltage drop capacitor Cstd may be charged. Since the charge voltage of the second liquid crystal is capacitor Clcl may be lowered by the capacitance of the voltage drop capacitor Cstd, the charge voltage of the second liquid crystal capacitor Clcl may become lower than the charge voltage of the first liquid crystal capacitor Clch.

In this case, the charge voltages of the first liquid crystal capacitor Clch and the second liquid crystal capacitor Clcl may show different gamma curves, and the gamma curve of one pixel voltage may become a curve obtained by synthesizing the above curves. The synthetic gamma curve at a front side may be similar or identical with the standard gamma curve that is set to be suitable at the front side, and the synthetic gamma curve at a lateral side may be set to be standard gamma curve at the front side. Side visibility may be improved by changing the image data as described above.

Figure 2:
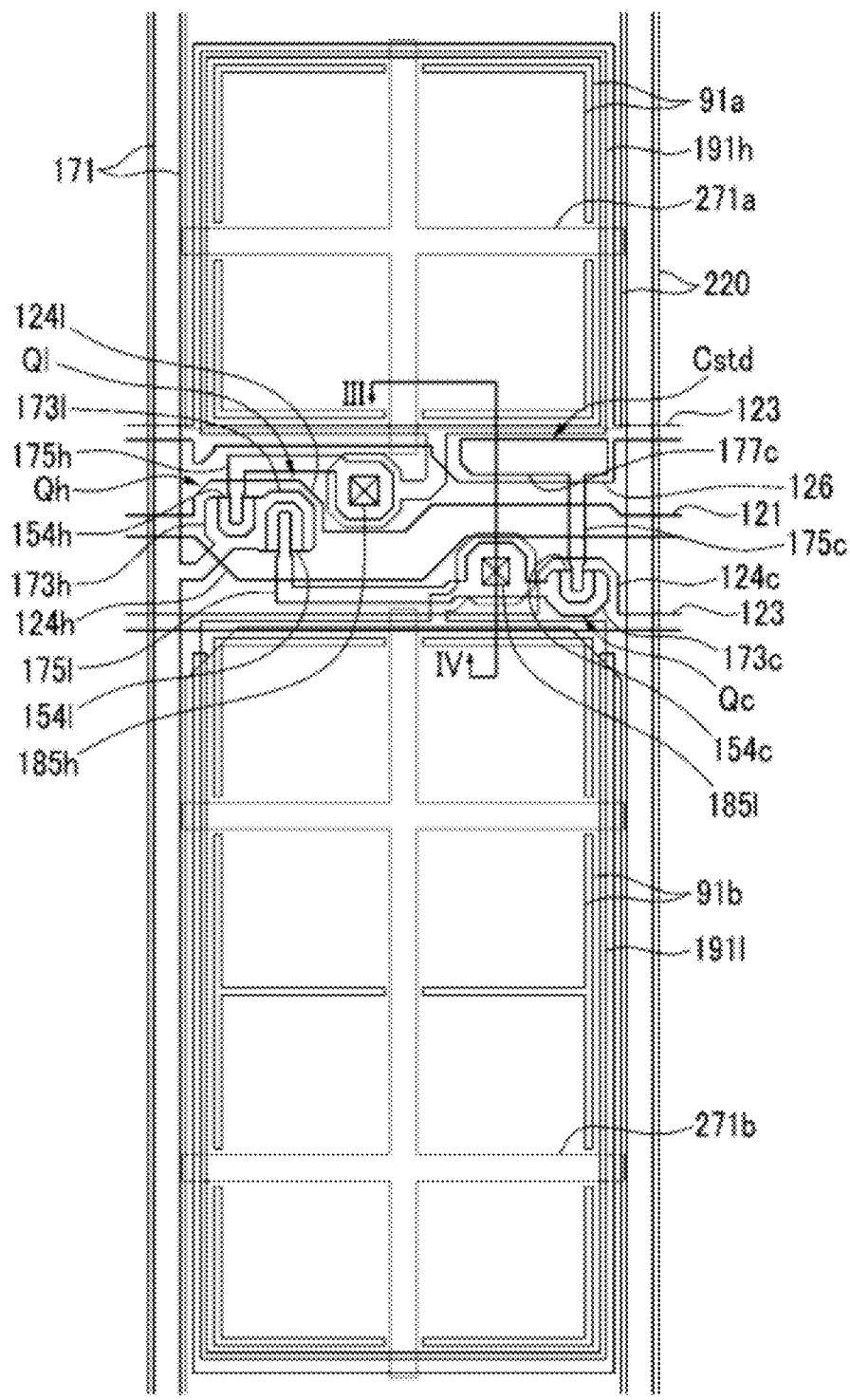
FIG. 2 is a layout view of a liquid crystal display according to an exemplary embodiment of the present invention.
Figure 3:
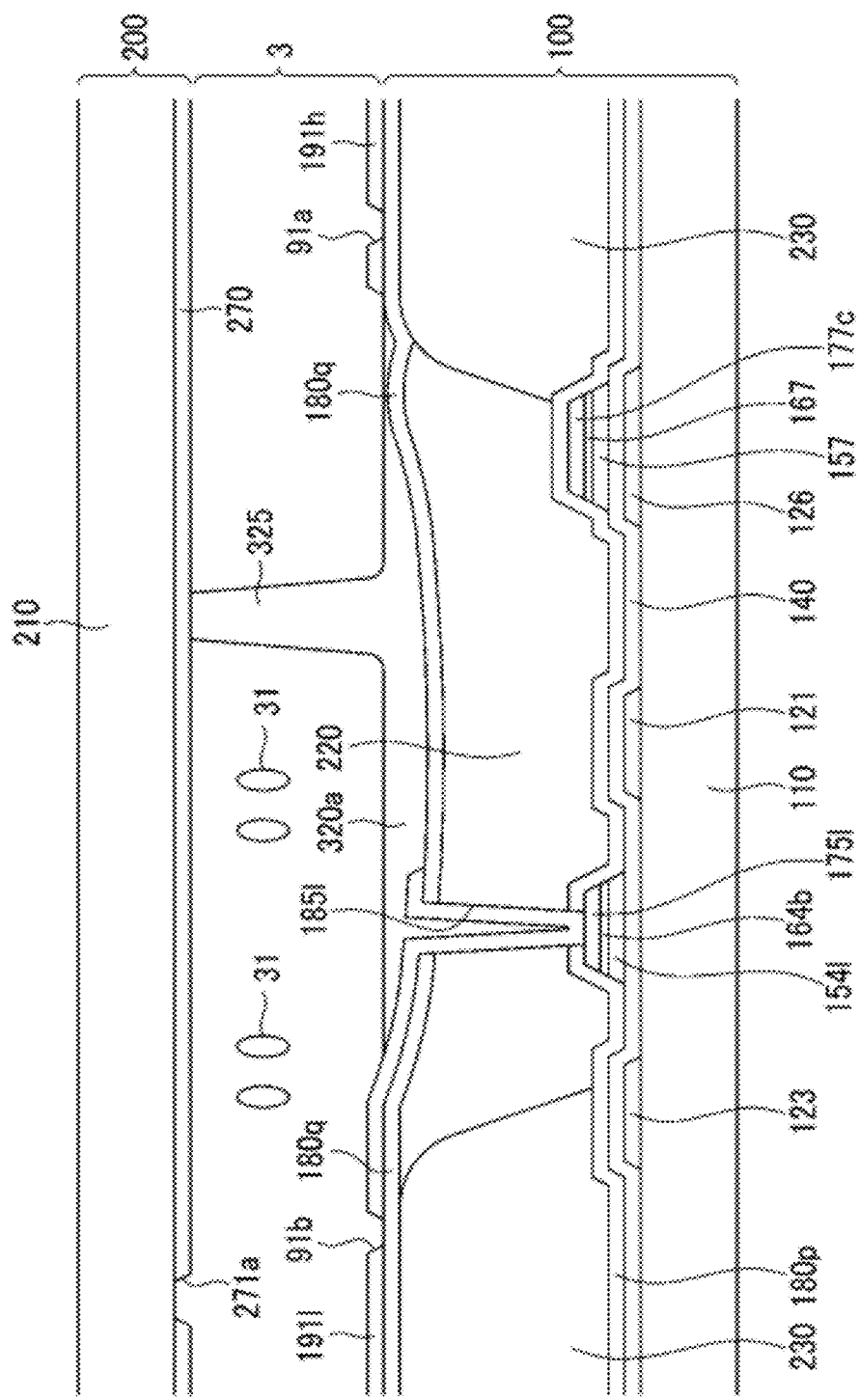
FIG. 3 is a cross-sectional view taken along line III-IV of the liquid crystal display of FIG. 2.
Figure 4:
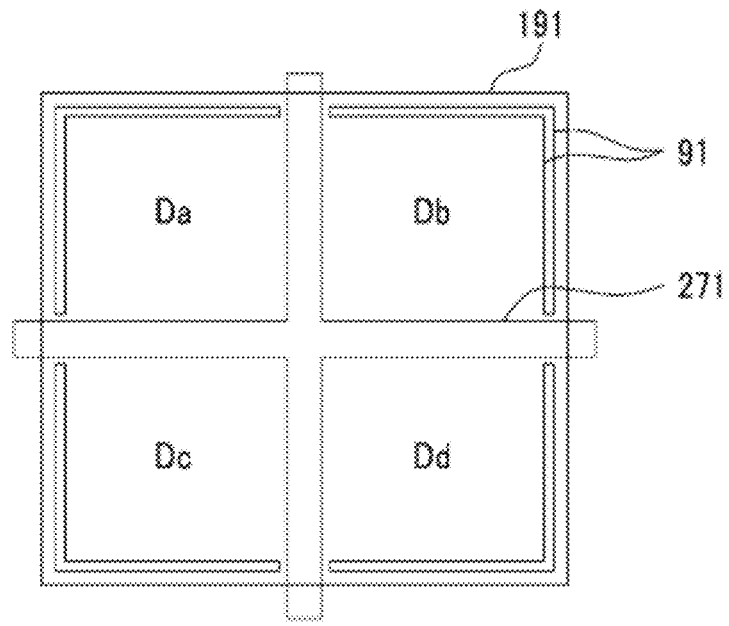
FIG. 4 is a plan view illustrating a basic region of a field generating electrode of a liquid crystal display according to an exemplary embodiment of the present invention.

The liquid crystal display illustrated in FIG. 1 will be described in more detail with reference to FIG. 2, FIG. 3, and FIG. 4. FIG. 2 is a layout view of a liquid crystal display according to an exemplary embodiment of the present invention. FIG. 3 is a cross-sectional view taken along line III-IV of the liquid crystal display of FIG. 2. FIG. 4 is a plan view illustrating a basic region of a field generating electrode of a liquid crystal display according to an exemplary embodiment of the present invention.

With reference to FIG. 2 and FIG. 3, the liquid crystal display according to the exemplary embodiment includes a lower panel 100 and an upper panel 200 facing each other, a liquid crystal layer 3 interposed between the lower panel 100 and the upper panel 200, and a pair of polarizers (not shown) attached to the outer surfaces of the lower panel 100 and the upper panel 200.

First, the lower panel 100 will be described.

A plurality of gate conductors including a plurality of gate lines 121, a plurality of voltage drop gate lines 123, and a plurality of storage electrode lines 125 are formed on an insulation substrate 110.

The gate line 121 and the voltage drop gate line 123 may extend in a horizontal direction and transfer a gate signal. The gate line 121 includes a first gate electrode 124h and a second gate electrode 124l that protrude upward and downward. The voltage drop gate line 123 includes a third gate electrode 124c that protrudes upward. The first gate electrode 124h and the second gate electrode 124l are connected to each other to form one protrusion portion.

The storage electrode line 125 extends in a horizontal direction and transfers a reference voltage, such as a common voltage Vcom. The storage electrode line 125 includes a storage electrode that protrudes upward and downward, a pair of vertical portions that vertically extend downward with respect to the gate line 121, and a horizontal portion, through which a pair of vertical portions are connected to each other. The horizontal portion includes a capacitive electrode 126 extending downward.

A gate insulating layer 140 is formed on the gate conductor 121, the voltage drop line 123, and the capacitive electrode 126.

A plurality of semiconductor strips that may be made of amorphous, crystalline silicon, or the like are formed on the gate insulating layer 140. The semiconductor stripe may extend in a vertical direction, and includes a first semiconductor 154h and a second semiconductor 154l that extend toward the first gate electrode 124h and the second gate electrode 124l and are connected to each other. A third semiconductor 154c is connected to the second semiconductor 154l. The third semiconductor 154c extends to form a fourth semiconductor 157.

A plurality of ohmic contact strips (not shown) are formed on the semiconductor stripe, a first ohmic contact (not shown) may be formed on the first semiconductor 154h, and a second ohmic contact 164b and a third ohmic contact (not shown) may be formed on the second semiconductor 154l and the third semiconductor 154c, respectively. The ohmic contact strip includes a first protrusion portion (not shown) that may form a pair in conjunction with the first ohmic contact island and disposed on the first protrusion portion of the semiconductor, a second protrusion portion (not shown) that may form a pair in conjunction with the second ohmic contact island and disposed on the second protrusion portion of the semiconductor, and a third protrusion portion (not shown) that may form a pair in conjunction with the third ohmic contact island and disposed on the third protrusion portion of the semiconductor. The third ohmic contact may extend to form a fourth ohmic contact 167.

A data conductor that may include a plurality of data lines 171, a plurality of first drain electrodes 175h, a plurality of second drain electrodes 175l, and a plurality of third drain electrodes 175c may be formed on the ohmic contacts 167.

The data line 171 may transfer a data signal and extend in a vertical direction to cross the gate line 121 and the voltage drop gate line 123. Each data line 171 may include a first source electrode 173h and a second source electrode 173l that extend toward the first gate electrode 124h and the second gate electrode 124l to form a W-shape together.

The first drain electrode 175h, the second drain electrode 175l, and the third drain electrode 175c each include one wide end portion and the other rod-shaped end portion. The rod-shaped end portions of the first drain electrode 175h and the second drain electrode 175l are partially surrounded by the first source electrode 173h and the second source electrode 173l. The wide end portion of the second drain electrode 175l further extends to form a U-shaped third source electrode 173c. The wide end portion 177c of the third drain electrode 175c overlaps the capacitive electrode 126 to form the voltage drop capacitor Cstd and the rod-shaped end portion is partially surrounded by the third source electrode 173c.

The first electrode 124h, the second electrode 124l, the third gate electrode 124c, the first source electrode 173h, the second source electrode 173l, the third source electrode 173c, the first drain electrode 175h, the second drain electrode 175l, the third drain electrode 175c, the first semiconductor 154h, the second semiconductor 154l, and the third semiconductor 154c form a first thin film transistor (TFT) Qh, a second TFT Ql, and a third TFT Qc. A channel of the thin film transistor is formed in each of the semiconductors between each of the source electrodes and the drain electrodes.

The semiconductor strip including the first semiconductor 154h, the second semiconductor 154l, and the third semiconductor 154c may have the same or similar flat surface shape as the data conductor 171, the first drain electrode 175h, the second drain electrode 175l, and the third drain electrode 175c, as well as the ohmic contacts 167 disposed therebeneath, except for a channel region between the source electrodes (the first source electrode 173h, the second source electrode 173l, and the third source electrode 173c) and the drain electrodes (the first drain electrode 175h, the second drain electrode 175l, and the third drain electrode 175c). That is, there are spaces disposed between the respective source electrodes and the respective drain electrodes, and an exposed portion that is not covered by the data conductors (the data conductor 171, the first drain electrode 175h, the second drain electrode 175l, and the third drain electrode 175c) in the semiconductor strip, which includes the first semiconductor 154h, the second semiconductor 154l, and the third semiconductor 154c.

A lower passivation layer 180p that may be made of an inorganic insulator, such as silicon nitride or silicon oxide, is formed on the data conductor 171, the first drain electrode 175h, the second drain electrode 175l, the third drain electrode 175c and the exposed portion of the first semiconductor 154h, the second semiconductor 154l, and the third semiconductor 154c.

A color filter 230 is disposed on the lower passivation layer 180p. The color filter 230 may be disposed in various regions other than regions in which the first thin film transistor Qh, the second thin film transistor Ql, and the third thin film transistor Qc are disposed. However, the color filter 230 may longitudinally extend in a vertical direction along the space between the data lines 171 that are adjacent to each other. Each color filter 230 may display any one of three primary colors of red, green and blue colors.

A light blocking member 220 may be disposed on a region in which the color filter 230 is not disposed and on a portion of the color filter 230. The light blocking member 220 may also be called a black matrix, which may prevent or reduce light leakage. The light blocking member 220 may extend along the gate line 121 and voltage drop gate line 123 to expand upward and downward, and includes a first light blocking member 220a and a second light blocking member 220b extending along the data line 171. The first light blocking member 220a may cover the region in which the first thin film transistor Qh, the second thin film transistor Ql, and the third thin film transistor Qc are disposed. A height of a portion of the light blocking member 220 may be smaller than that of the color filter 230.

An upper passivation layer 180q is formed on the color filter 230 and light blocking member 220. The upper passivation layer 180q may prevent or reduce the likelihood of the color filter 230 and the light blocking member 220 from being lifted, and suppress contamination of the liquid crystal layer 3 by an organic material, such as a solvent flowing from the color filter 230, thereby preventing or reducing a likelihood of incurring defects, such as afterimages that may occur if driving an image.

A plurality of first contact holes 185 h and a plurality of second contact holes 185l through which the wide end portion of the first drain electrode 175h and the wide end portion of the second drain electrode 175l, are exposed may be formed through the lower passivation layer 180p, the light blocking member 220, and the upper passivation layer 180q.

A plurality of pixel electrodes 191 are formed on the upper passivation layer 180q. The pixel electrode 191 has a first cutout 91a and a second cutout 91b formed along its edges.

The arrangement of the liquid crystal molecules may be controlled in a desired direction by forming the cutout 91a and the cutout 91b along the edge of the pixel electrode 191 to form a horizontal electric field even at the edge of the pixel area. In an example, a cutout may be an opening.

With reference to FIG. 2, each pixel electrode 191 includes a first subpixel electrode 191h and a second subpixel electrode 191l that are separated from each other with the gate line 121 and the voltage drop gate line 123 disposed therebetween. Further, each pixel electrode 191 may be disposed above and beneath the pixel area with the gate line 121 and the voltage drop gate line 123 located at a central region thereof to be adjacent to each other in a column direction.

The first subpixel electrode 191h and the second subpixel electrode 191l may receive a data voltage through the first contact hole 185 h and the second contact hole 185l from the first drain electrode 175h and the second drain electrode 175l, respectively. The first subpixel electrode 191h and the second subpixel electrode 191l to which the data voltage may be applied generate an electric field in conjunction with the common electrode 270 of the common electrode panel 200 to determine a direction of the liquid crystal molecules between the pixel electrode 191 and the common electrode 270. As described above, the luminance of light passing through the liquid crystal layer 3 may be changed according to the determined direction of the liquid crystal molecules.

The first subpixel electrode 191h, the common electrode 270, and the liquid crystal layer 3 therebetween form the first liquid crystal capacitor Clch. The second subpixel electrode 191l, the common electrode 270, and the liquid crystal layer 3 therebetween form the second liquid crystal capacitor Clcl. The first liquid crystal capacitor Clch and the second liquid crystal capacitor Clcl may maintain the applied voltage even if the first TFT Qh and the second TFT Ql are turned off.

The first subpixel electrode 191h and the second subpixel electrode 191l overlap the storage electrode 129 and the storage electrode line 125 to form the first storage capacitor Csth and the second storage capacitor Cstl. The first storage capacitor Csth and the second storage capacitor Cstl may strengthen the voltage storage ability of the first liquid crystal capacitor Clch and the second liquid crystal capacitor Clcl.

The capacitive electrode 126 and an extending portion 177c of the third drain electrode 175c overlap with the gate insulating layer 140 with the fourth semiconductor layer 157 and the fourth ohmic contact 167 interposed therebetween to form the voltage drop capacitor Cstd. In another exemplary embodiment of the present invention, the fourth semiconductor layer 157 and the fourth ohmic contact 167 disposed between the capacitive electrode 126 and the extending portion 177c of the third drain electrode 175c forming the voltage drop capacitor Cstd may be removed.

A coloring member 320 is formed on the upper passivation layer 180q. The coloring member 320 is disposed on the light blocking member 220. The coloring member 320 extends along the gate line 121 and the voltage drop gate line 123 to expand upward and downward. Further, the coloring member 320 includes a first coloring member 320a and a second coloring member 320b disposed along a first light blocking member 220a covering the region in which the first thin film transistor Qh, the second thin film transistor Ql, and the third thin film transistor Qc are disposed and a second light blocking member 220b extending along the data line 171.

The first coloring member 320a and the second coloring member 320b compensate a difference in height of the light blocking member 220 and the color filter 230 to constantly control a cell gap between the liquid crystal layer disposed on the color filter 230 and the liquid crystal layer disposed on the light blocking member 220. Further, the first coloring member 320a and the second coloring member 320b may reduce a likelihood of light leakage of the light blocking member 220. Likewise, since the first coloring member 320a and the second coloring member 320b compensate a difference in height of the light blocking member 220 and the color filter 230, and the liquid crystal molecules disposed between the light blocking member 220 and the color filter 230 may not be controlled by a step between the light blocking member 220 and the color filter 230, such that a likelihood of light leakage of the edge portion of the pixel electrode may be reduced. In addition, since the cell gap on the light blocking member 220 may be decreased, the average cell gap may be decreased, such that the total amount of liquid crystal used in the liquid crystal display may be decreased.

A lower alignment layer (not shown) may be formed on the pixel electrode 191, the exposed upper passivation layer 180q, the first coloring member 320a, and the second coloring member 320b. The lower alignment layer may be a vertical alignment layer or an alignment layer optically aligned by using a photo-polymerization material.

Next, the upper panel 200 will be described.

A common electrode 270 is formed on the insulation substrate 210. The common electrode 270 has a first cutout 271a and a second cutout 271b.

The first cutout 271a of the common electrode 270 is disposed at a position corresponding to the first subpixel electrode 191h, and the second cutout 271b is disposed at a position corresponding to the second subpixel electrode 191l.

In view of the flat surface shape, the first cutout 271a and the second cutout 271b may have a cross shape, and edges of the cutouts may protrude farther than the corresponding edges of the first subpixel electrode 191h and the second subpixel electrode 191l. Likewise, an effect of the horizontal electric field may be stably applied up to the edges of the pixel area by forming the edges of the cutouts of the common electrode 270 to protrude further than the edges of the pixel electrode, such that the arrangement of the liquid crystal molecules may be controlled in a desired direction even at the edge of the pixel area.

Widths of the first cutout 271a and the second cutout 271b may be about three times the thickness of the liquid crystal layer 3 or less. The thickness of the liquid crystal layer 3 may refer to a cell gap.

The first subpixel electrode 191h and the second subpixel electrode 191l may be divided into a plurality of subregions along the edges of the first cutout 271a and the second cutout 271b and the edges of the first subpixel electrode 191h and the second subpixel electrode 191l.

An upper alignment layer (not shown) may be formed on the common electrode 270. The lower alignment layer may be a vertical alignment layer or an alignment layer optically aligned by using a photo-polymerization material.

A polarizer (not shown) may be provided on the outer surfaces of the lower panel 100 and the upper panel 200. Further, transmissive axes of the two polarizers may be orthogonal to each other and one transmissive axis of the axes may be parallel to the gate line 121. However, the polarizer may be disposed on one outer surface of the lower panel 100 and the upper panel 200.

The liquid crystal layer 3 has a negative dielectric anisotropy, and the liquid crystal molecules of the liquid crystal layer 3 may be aligned so that long axes thereof are vertical to the surfaces of the lower panel 100 and the upper panel 200 in a state in which there is no electric field. Therefore, the incident light may not pass through the crossed polarizers, and may be blocked in a state in which there is no electric field.

As described above, the first subpixel electrode 191h and the second subpixel electrode 191l, to which the data voltage may be applied, generate an electric field in conjunction with the common electrode 270 of the upper panel 200. Electric field may be generated, such that the liquid crystal molecules of the liquid crystal layer 3, which may be aligned vertically to the surfaces of the pixel electrode 191 and the common electrode 270 in a state in which there is no electric field, lie in a horizontal direction in respect to the surfaces of the pixel electrode 191 and the common electrode 270. Accordingly, the luminance of light passing through the liquid crystal layer 3 may be changed according to the degree of the liquid crystal molecule alignment.

According to another exemplary embodiment of the present invention, the liquid crystal display may further include a spacer 325 to maintain the cell gap between the lower panel 100 and the upper panel 200. The spacer 325 may be formed on the same layer as the first coloring member 320a and the second coloring member 320b at the same time.

The liquid crystal layer 3 interposed between the lower panel 100 and the upper panel 200 includes liquid crystal molecules 31 having a negative dielectric anisotropy and polymers. The liquid crystal molecules 31 may be aligned so that long axes have a pretilt to be aligned in parallel to a direction from four portions, at which the edges of the first subpixel electrode 191h and the second subpixel electrode 191l extending in different directions meet toward the central portion of the first cutout 271a and the second cutout 271b of the common electrode 270 having the cross shape. The liquid crystal molecules 31 may be aligned vertical to the surfaces of the lower panel 100 and the upper panel 200, by the first cutout 271a and the second cutout 271b of the first common electrode 271a and the second common electrode 271b, respectively, and the edges of the first subpixel electrode 191h and the second subpixel electrode 191l. Accordingly, each of the first subpixel and the second subpixel has four subregions having different pretilt directions of liquid crystal.

In the case of the liquid crystal display according to the exemplary embodiment, the cutout 271 having the cross shape may be formed on the common electrode 270. The cutout 271 may be formed on at least one of the pixel electrode 191 and the common electrode 270 that may be an electric field generating electrode. More specifically, the cutout 271 having the cross shape may be formed on the pixel electrode 191, and may be formed on all or some of the pixel electrodes 191 and the common electrode 270.

Then, a basic region of a field generating electrode of the liquid crystal display according to the exemplary embodiment of the present invention will be described with reference to FIG. 4. FIG. 4 is a plan view illustrating a basic region of a field generating electrode of a liquid crystal display according to an exemplary embodiment of the present invention.

As shown in FIG. 4, the basic region of the field generating electrode is formed of a pixel electrode 191 facing the cutout 271 of the common electrode 270, and a cutout 91 of the pixel electrode 191 surrounding the cutout 271 of the common electrode 270. If the liquid crystal display is seen from above, the basic region defined by the cutout 271 of the common electrode 270 and the edge of the pixel electrode 191 may be divided into a plurality of regions, including a first region Da, a second region Db, a third region Dc, and a fourth region Dd. The plurality of regions may be symmetrical to each other based on the cutout 271 of the common electrode 270.

As described above, from a view of the flat surface shape, the cutout 271 of the common electrode 270 may have a cross shape, and an edge 272 of the cutout 271 protrudes farther than the corresponding edge of the pixel electrode 191. The width of the cutout 271 of the common electrode 270 may be about 2 μm to about 10 μm.

The cutout 91 of the pixel electrode 191 may be formed in a quadrangle ring shape along the edge of the pixel electrode 191, and may be disconnected around a portion corresponding to the end of the cutout 271 of the common electrode 270. Likewise, the portion at which the cutout 91 formed in the pixel electrode 191 is disconnected may become a connection portion of the pixel electrode 191. The width of the connection portion of the pixel electrode 191 may be larger than that of the corresponding cutout 271 of the common electrode 270.

The cutout 91 of the pixel electrode 191 may be disposed at a position spaced apart from the edges of the pixel electrode 191 by an interval of two times the cell gap of the liquid crystal display or less, and the width of the cutout 91 may be two times the cell gap of the liquid crystal display or less.

The width of the cutout 271 having the cross shape may be three times the thickness of the liquid crystal layer 3 or less. The thickness of the liquid crystal layer 3 may refer to the cell gap.

In the case of the liquid crystal display according to an exemplary embodiment, the cutout 271 having the cross shape may be formed on the common electrode 270, but the cutout 271 may be formed on at least one of the pixel electrodes 191 and the common electrode 270 that may be generating an electric field. More specifically, the cutout 271 having the cross shape may be formed on the pixel electrode 191, and may be formed on some or all of the pixel electrodes 191 and the common electrode 270.

Figure 5:
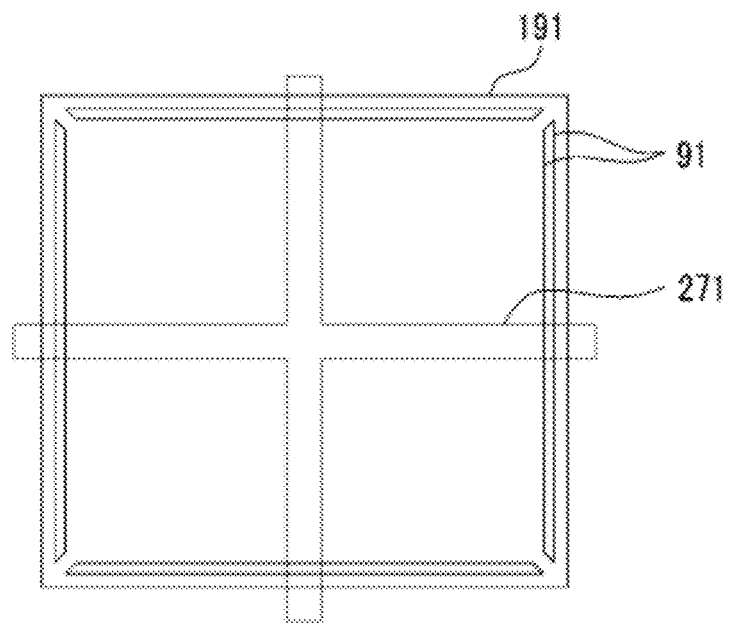
FIG. 5 is a plan view illustrating a basic region of a field generating electrode of a liquid crystal display according to an exemplary embodiment of the present invention.

A basic region of a field generating electrode of the liquid crystal display according to the exemplary embodiment of the present invention will be described with reference to FIG. 5. FIG. 5 is a plan view illustrating a basic region of a field generating electrode of a liquid crystal display according to an exemplary embodiment of the present invention.

As shown in FIG. 5, the basic region of the field generating electrode is formed of a pixel electrode 191 facing the cutout 271 of the common electrode 270, and a cutout 91 of the pixel electrode 191 surrounding the cutout 271 of the common electrode 270. If the liquid s crystal display is seen from above, the basic region defined by the cutout 271 of the common electrode 270 and the edge of the pixel electrode 191 may be divided into a plurality of regions, including a first region Da, a second region Db, a third region Dc, and a fourth region Dd. The plurality of regions may be symmetrical to each other based on the cutout 271 of the common electrode 270.

As described above, in view of the flat surface shape, the cutout 271 of the common electrode 270 may have a cross shape, and an edge of the cutout 271 protrudes farther than the corresponding edge of the pixel electrode 191. The width of the cutout 271 of the common electrode 270 may be about 2 μm to about 10 μm.

The cutout 91 of the pixel electrode 191 is formed in a quadrangle ring shape along the edge of the pixel electrode 191, and is disconnected at four portions at which the edges of the pixel electrode 191 extending in different directions meet, that is, corner portions of the pixel electrode 191. Likewise, the portion at which the cutout 91 is formed in the pixel electrode 191 is disconnected becomes a connection portion of the pixel electrode. Unlike the aforementioned exemplary embodiment illustrated in FIG. 4, the cutout 91 of the pixel electrode 191 partially overlaps the cutout 271 of the common electrode 270.

The cutout 91 of the pixel electrode 191 may be disposed at a position spaced apart from the edge of the pixel electrode 191 by an interval of two times the cell gap of the liquid crystal display or less, and the width of the cutout 91 may be two times the cell gap of the liquid crystal display or less.

The width of the cutout 271 having the cross shape may be about three times the thickness of the liquid crystal layer 3 or less. The thickness of the liquid crystal layer 3 may refer to the cell gap.

In the case of the liquid crystal display according to an exemplary embodiment, the cutout 271 having the cross shape may be formed on the common electrode 270 and on at least one of the pixel electrode 191 that may be generating an electric field. More specifically, the cutout having the cross shape may be formed on the pixel electrode 191, and may be formed on some or all of the pixel electrodes 191 and the common electrode 270.

Figure 6:
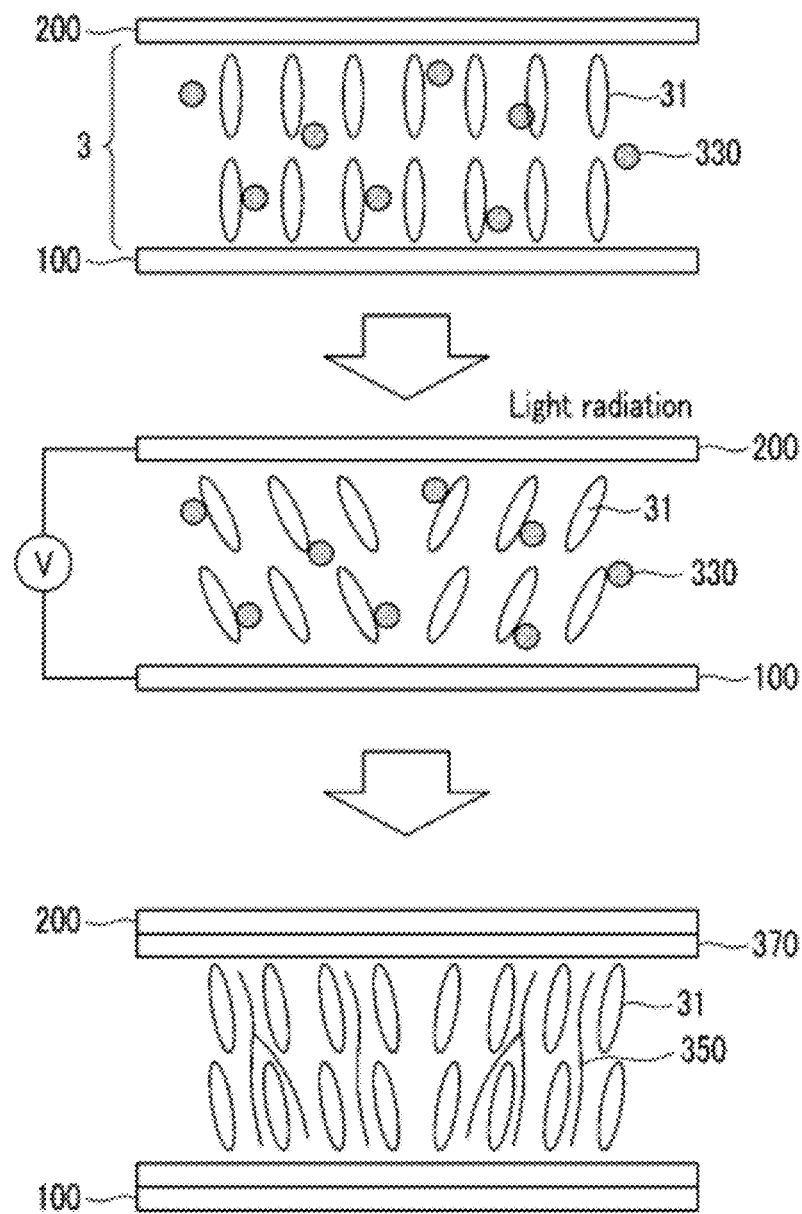
FIG. 6 is a view illustrating a process for allowing liquid crystal molecules to have a pretilt by using a prepolymer polymerized by rays according to an exemplary embodiment of the present invention.
Figure 7:
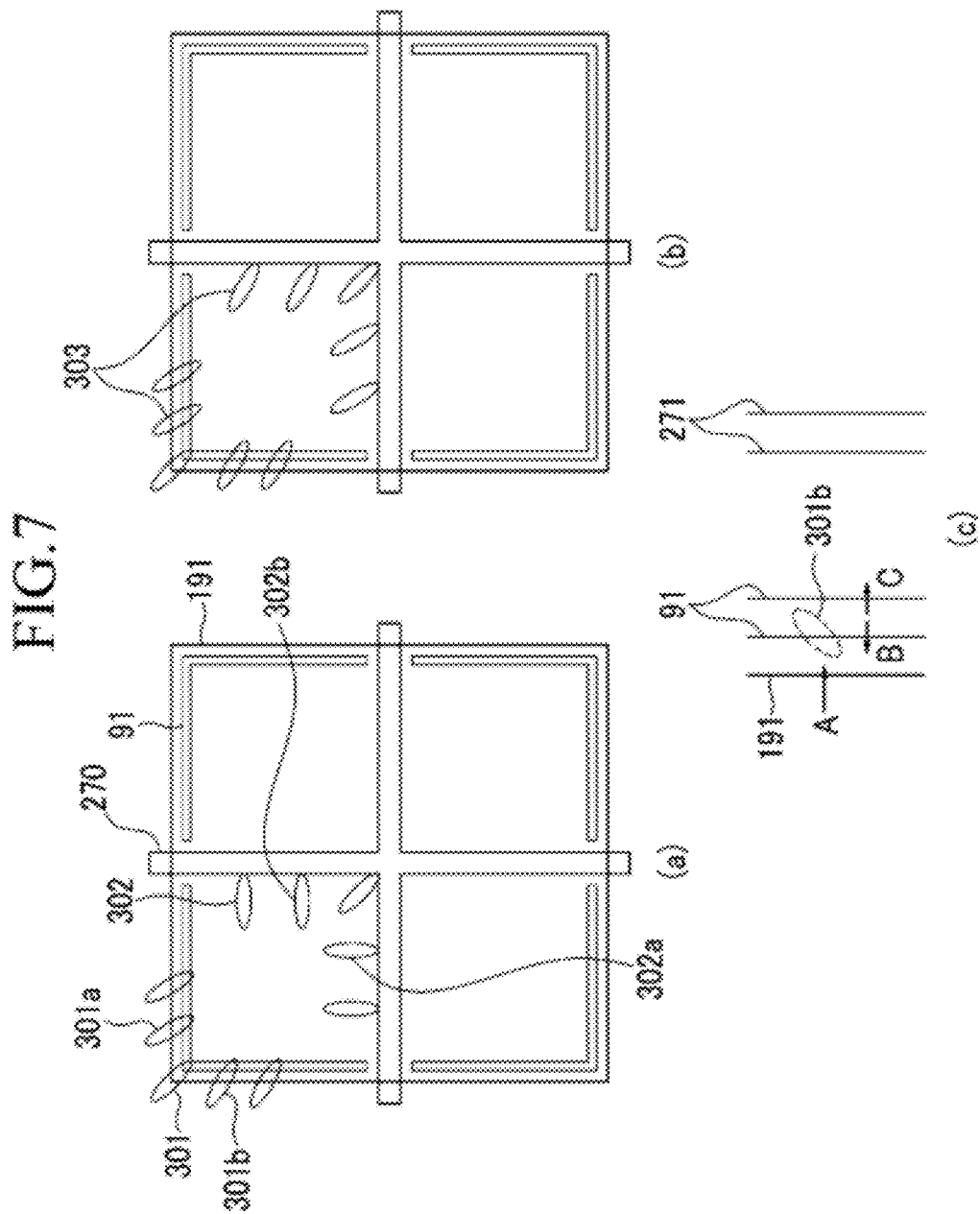
FIG. 7 is a conceptual view illustrating an arrange direction of directors of liquid crystal molecules of a liquid crystal display according to an exemplary embodiment of the present invention.

An initial alignment method for allowing the liquid crystal molecules 31 to have a pretilt will be described with reference to FIG. 6 and FIG. 7. FIG. 6 is a view illustrating a process for allowing liquid crystal molecules to have a pretilt by using a prepolymer polymerized by rays according to an exemplary embodiment of the present invention. FIG. 7 is a conceptual view illustrating a liquid crystal direction in a basic region of the field generating electrode of the liquid crystal display according to the exemplary embodiment of the present invention.

Prepolymers 330, such as monomers cured by polymerization by rays, which may include ultraviolet rays, and liquid crystal materials are injected together between the lower panel 100 and the upper panel 200. In this case, the prepolymer 330 may be included in an alignment layer (not shown) formed on the lower panel 100 and the upper panel 200 as well as the liquid crystal layer. The prepolymer 330 may be a reactive mesogen polymerized by rays, such as ultraviolet rays.

The data voltage may be applied to the first subpixel electrode 191h and the second subpixel electrode 191l, and the common voltage may be applied to the common electrode 270 of the upper panel 200 to form an electric field on the liquid crystal layer 3, which may be disposed between the lower panel 100 and the upper panel 200. The liquid crystal molecules 31 of the liquid crystal layer 3 may respond to the electric field to be tilted in parallel to a direction from four portions, at which the edges of the pixel electrode 191 extending in different directions meet toward the central portion of the cutout 271 of the common electrode 270 having the cross shape, by a horizontal electric field generated by the cutout 271 of the common electrode 270 and the edge of the pixel electrode 191. The tilt directions of the liquid crystal molecules 31 may become four directions in one basic region of the field generating electrode.

In this regard, a description will be given with reference to FIG. 7. With reference to FIG. 7, subfigure (a), a first director 301a and a second director 301b of the liquid crystal molecules, at a portion adjacent to the edge of the pixel electrode 191 forming a basic region of the field generating electrode, meet an edge of the pixel electrode 191 at a reference angle. In addition, the first director 302a and the second director 302b of the liquid crystal molecules, at the portion adjacent to the cutout 271 of the common electrode forming the basic region of the field generating electrode, may be vertical to the edge of the cutout 271 of the common electrode 270. Likewise, liquid crystal directors according to the horizontal electric field generated by the edge of the pixel electrode 191 forming the basic region of the field generating electrode, the cutout 91 of the pixel electrode 191, and the cutout 271 of the common electrode may be arranged in a direction to allow the liquid crystal molecules to meet each other to minimize deformation. The secondary arrangement direction may become a vector sum direction of directions of the directors. Accordingly, as illustrated in FIG. 7, subfigure (b), the liquid crystal directors may be aligned or oriented, at a reference angle, toward a central portion of the cutout 271 of the common electrode 270 having the cross shape. The directors of the liquid crystal molecules 31 according to the horizontal electric field may be similarly arranged in the subregions, including the first subregion Da, the second subregion Db, the third subregion Dc, and the fourth subregion Dd. The tilt direction of the liquid crystal molecules in each basic region of the field generating electrode may provide four separate directions. More specifically, the directors of the liquid crystal molecules 31 may be arranged at an incline in a right-down direction from the pixel edges toward the central portion of the cutout 271 in the first subregion Da, the directors of the liquid crystal molecules 31 may be arranged at an incline in a left-down direction from the pixel edges toward the central portion of the cutout 271 in the second subregion Db, the directors of the liquid crystal molecules 31 may be arranged at an incline in a right-up direction from the pixel edges toward the central portion of the cutout 271 in the third subregion Dc, and the directors of the liquid crystal molecules 31 may be arranged at an incline in a left-up direction from the pixel edges toward the central portion of the cutout 271 in the fourth subregion Dd.

The arrangement of liquid crystal according to the cutout 91 of the pixel electrode 191 of the liquid crystal display according to the exemplary embodiment will be described in more detail with reference to FIG. 7, subfigure (c).

With reference to FIG. 7, subfigure (c), in addition to a first horizontal electric field formed at the edge of the pixel electrode 191, a second horizontal electric field is formed by the cutout 91 formed in the adjacent portion of the edge of the pixel electrode 191. The size of the second horizontal electric field may be smaller than that of the first horizontal electric field, and the direction of the second horizontal electric field may be formed by two directions, one of a direction toward an external angle of the pixel electrode 191 and one of a direction toward the central portion of the pixel electrode 191. Accordingly, if the effects of the horizontal electric fields are combined, in view of the horizontal surface, the directors of the liquid crystal molecules may be arranged so as not to be aligned to the vertical edge of the pixel electrode 191 but be tilted towards the horizontal edge of the pixel electrode 191 at a reference angle. Accordingly, liquid crystals disposed at the edges of the pixel electrode 191 may be arranged similarly to the averaged arrangement direction of the liquid crystal molecules in each of subregions, including the first subregion Da, the second subregion Db, the third subregion Dc, and the fourth subregion Dd. Thereby, the arrangement of liquid crystals at the edges of the pixel electrode 191 may be similar to the arrangement direction of the liquid crystal molecules in each subregion Da, Db, Dc, or Dd. Accordingly, it may be possible to reduce a likelihood of a decrease in transmittance according to the irregular arrangement of the liquid crystal molecules, which may occur at the edge of the pixel electrode 191.

If rays such as ultraviolet rays are radiated after the electric field is formed on the liquid crystal layer 3 in a state where the liquid crystal molecules of the liquid crystal layer 3 are arranged as described above, the prepolymers 330 may be polymerized to form a polymer 370 as shown in FIG. 6. The polymer 370 may be formed to be adjacent to the lower panel 100 and the upper panel 200. The alignment direction of the liquid crystal molecules 31 may be determined to have a pretilt in the aforementioned direction by the polymer 370. Accordingly, the liquid crystal molecules 31 may be arranged to have a pretilt in four different directions where a voltage may not applied to the pixel electrode 191 and the common electrode 270, which may generated an electric field.

In the case of the liquid crystal display according to the exemplary embodiment, the cutout having the cross shape may be formed on the common electrode, but the cutout may be formed on at least one of the pixel electrode and the common electrode that generates an electric field. More specifically, the cutout having the cross shape may be formed on the pixel electrode, and may be formed on some or all of the pixel electrodes and the common electrode.

Unlike the aforementioned liquid crystal display according to the exemplary embodiments, in the case of liquid crystal displays according to other exemplary embodiments of the present invention, the basic region of the field generating electrode described with reference to FIG. 4 and FIG. 5 may be formed in multiple in one pixel area.

Then, the result of transmittance of the liquid crystal display according to an exemplary embodiment of the present invention will be described with reference to FIG. 8 and FIG. 9. FIG. 8 is a plan view illustrating a result of transmittance of the liquid crystal display according to an exemplary embodiment of the present invention.

Referring to FIG. 8, basic pixels having the same or similar size were formed, and the shapes of the field generating electrodes of the basic pixels were different in a configuration corresponding to subfigure (a) and a configuration corresponding to subfigure (b). Subfigure (a) illustrates a shape of the field generating electrode where the pixel electrode was formed to have a plurality of branched electrodes like a known liquid crystal display. Subfigure (b) illustrates a shape of the field generating electrode where the cutout 271 having the cross shape was formed in the common electrode 270 and the cutout 91 was formed at the portion adjacent to the edge of the pixel electrode 191 like the liquid crystal display according to the exemplary embodiment of the present invention. The conditions other than the shape of the basic pixel were the same, and the degree of transmittance of light was observed.

With reference to FIG. 8, as compared to the configuration (a) where the pixel electrode including a plurality of branched electrodes were formed like the known liquid crystal display, it could be seen that, in the configuration (b) of the liquid crystal display according to the exemplary embodiment of the present invention, the total transmittance was high, deterioration in transmittance occurring around the branched electrodes may be prevented or reduced, and deterioration in transmittance occurring at the edge of the pixel electrode may be largely prevented or reduced.

Then, the result of transmittance for voltage according to an exemplary embodiment of the present invention will be described with reference to FIG. 9. FIG. 9 is a graph illustrating a result of transmittance for a voltage according to an exemplary embodiment of the present invention. Referring to FIG. 9, basic pixels having the same or similar size were formed, and the shapes of the field generating electrodes of the basic pixels were different from each other in a case where the pixel electrode was formed to have a plurality of branched electrodes like a known liquid crystal display (case (a)), and in a case where the cutout 271 having the cross shape was formed in the common electrode 270 and the cutout 91 was formed at the portion adjacent to the edge of the pixel electrode 191 like the liquid crystal display is according to the exemplary embodiment of the present invention (case (b)). The conditions other than the shape of the basic pixel were the same, and the transmittance of light according to the applied voltage was measured, and shown in a graph.

Figure 9:
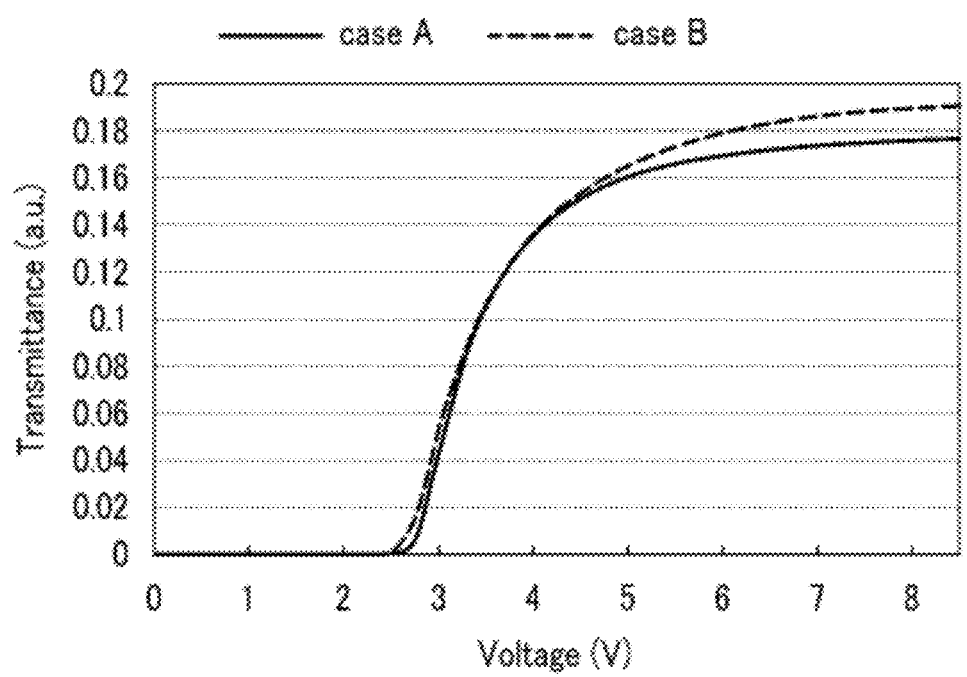
FIG. 9 is a graph illustrating a result of transmittance for voltage according to an exemplary embodiment of the present invention.

With reference to FIG. 9, it could be seen that there is no large difference with respect low gray, but the transmittance was increased as the gray was increased in the liquid crystal display with case (b) as compared to the liquid crystal display with case (a), in which the pixel electrode including a plurality of branched electrodes is formed.

Likewise, in the case of the liquid crystal display according to the exemplary embodiment of the present invention, a plurality of subregions having different tilt directions of liquid crystals may be formed while the pixel electrode does not have a plurality of branched electrodes, such that a viewing angle of the liquid crystal display may be broadened, a response speed of the liquid crystal molecules may be increased by aligning the liquid crystal molecules so as to be arranged in a reference direction. Further, visibility, an open ratio, and transmittance may be increased by dividing the pixel electrode into two electrodes and applying different voltages thereto.

Figure 10:
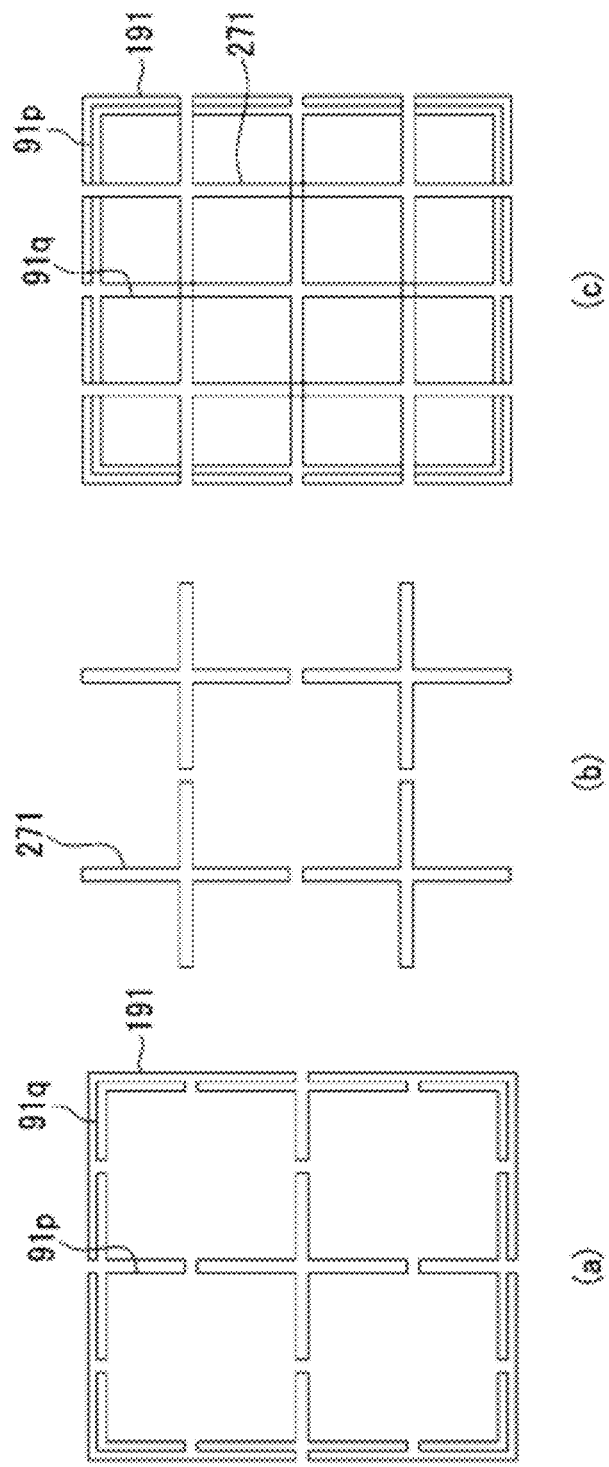
FIG. 10 is a plan view illustrating one pixel area of a liquid crystal display according to an exemplary embodiment of the present invention.

A liquid crystal display according to another exemplary embodiment of the present invention will be described with reference to FIG. 10. FIG. 10 is a plan view illustrating one pixel area of a liquid crystal display according to an exemplary embodiment of the present invention.

With reference to FIG. 10, the four cutouts 271 of the common electrode 270 are disposed in the region corresponding to the pixel electrode 191 disposed in one pixel area. In addition, the pixel electrode 191 has cutouts 91$p$ and 91$q$ formed so as to surround each cutout 271 of the common electrode 270. The cutout 91$p$ of the pixel electrode 191 is disposed between the cutouts 271 of the common electrode 270, and the cutout 91$q$ is formed along the edge of the pixel electrode 191. Accordingly, sixteen basic regions of the field generating electrode described with reference to FIG. 10 are formed in one pixel area.

Figure 11:
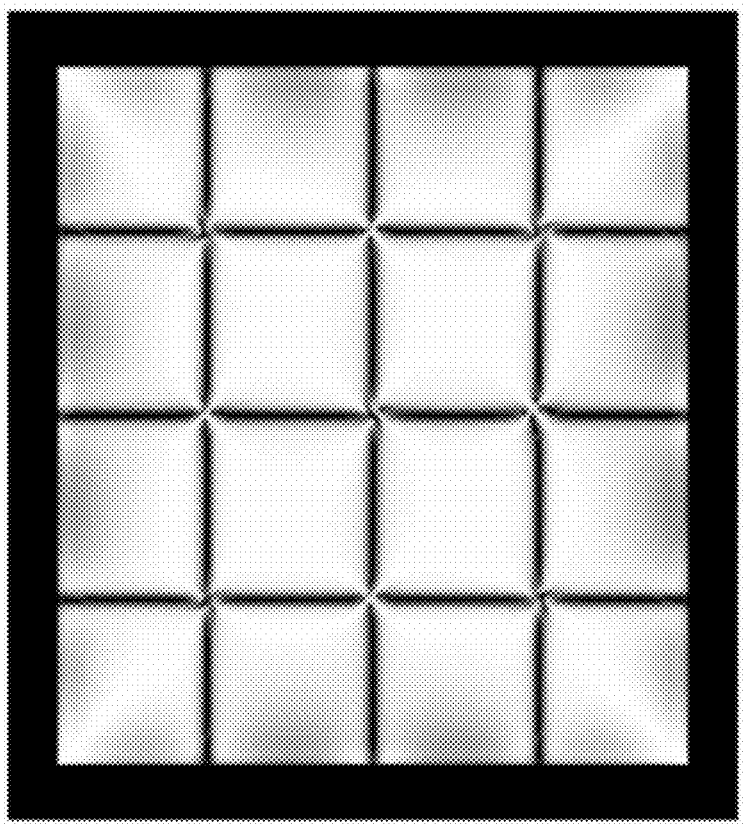
FIG. 11 is a plan view illustrating a result of transmittance of a liquid crystal display according to an exemplary embodiment of the present invention.

Then, transmittance of a liquid crystal display according to another exemplary embodiment of the present invention will be described with reference to FIG. 11. FIG. 11 is a plan view illustrating a result of transmittance of a liquid crystal display according to an exemplary embodiment of the present invention.

FIG. 11 shows the measurement result of transmittance in one pixel area of the liquid crystal display according to the exemplary embodiment illustrated in FIG. 10. Similar to the aforementioned embodiment, it could be seen that the transmittance was high as a whole and there was no decrease in transmittance even at the edge of each basic region.

The pixel electrode of the liquid crystal display according to the aforementioned exemplary embodiments has the cutout formed along the edge, and in the case of the liquid crystal display according to another exemplary embodiment of the present invention, the cutout may not be formed in the adjacent portion of a portion of the edges of the pixel electrode. More specifically, in the case where the interval between the adjacent pixel electrodes is narrow, the cutout may not be formed in the edges close to the adjacent pixel.

Figure 12:
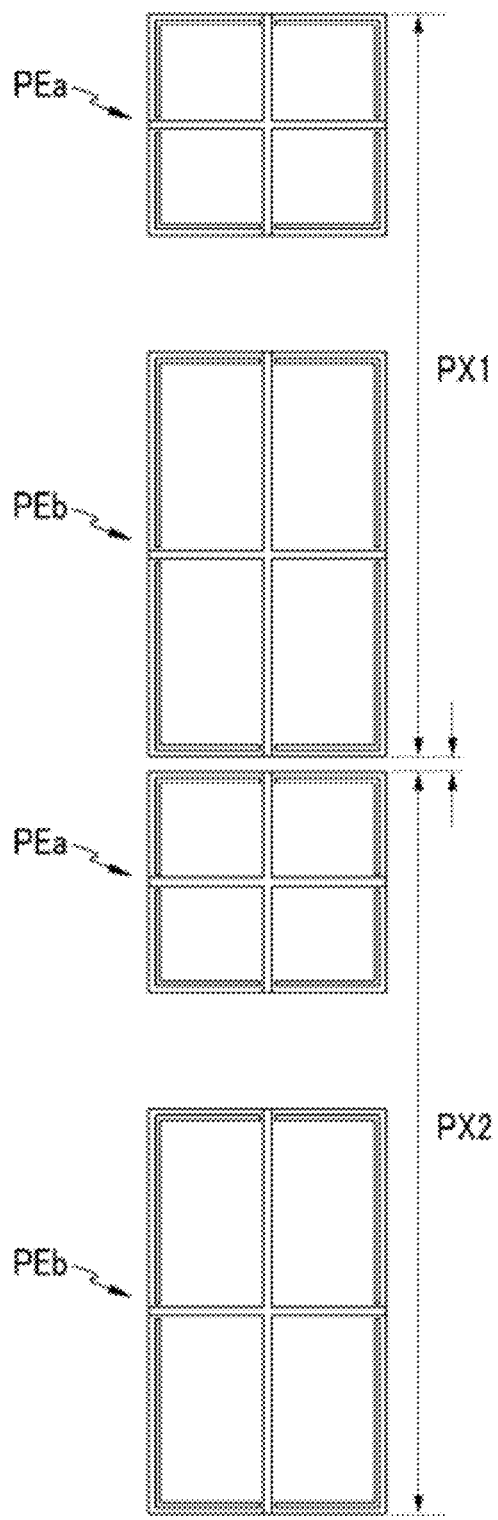
FIG. 12 is a plan view illustrating two adjacent pixel areas of a liquid crystal display according to an exemplary embodiment of the present invention.
Figure 13:
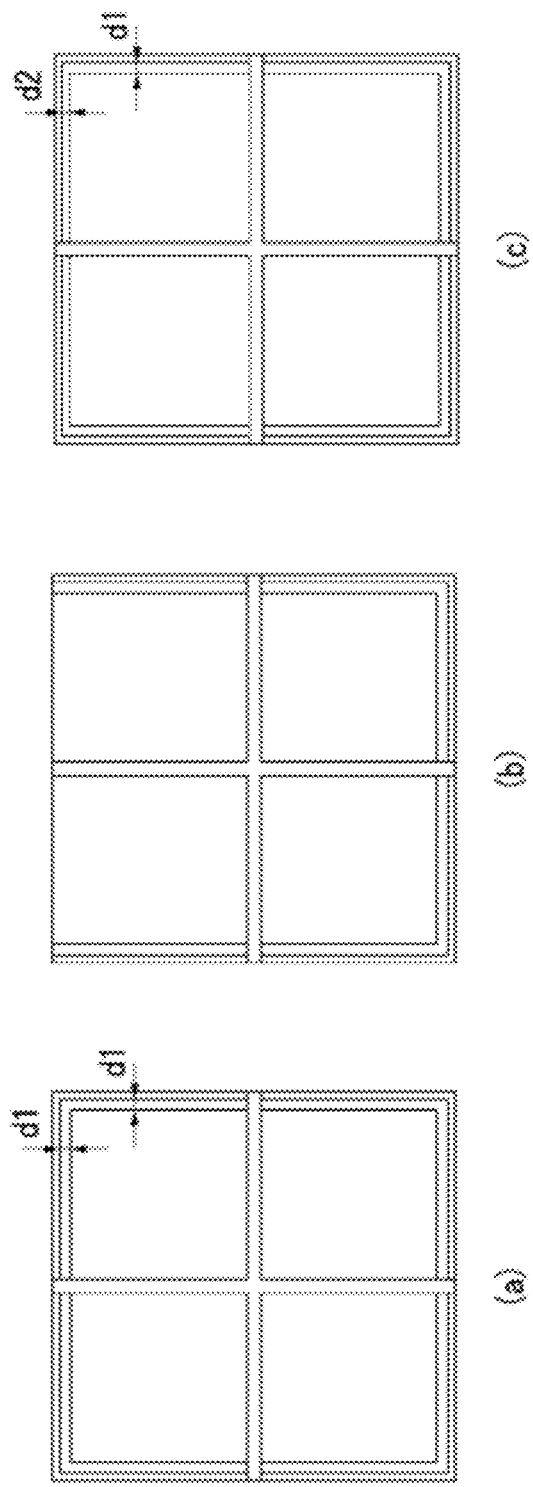
FIG. 13 is a plan view illustrating a portion of a pixel area of a liquid crystal display according to an exemplary embodiment of the present invention.

A liquid crystal display according to another exemplary embodiment of the present invention will be described with reference to FIG. 12 and FIG. 13. FIG. 12 is a plan view illustrating two adjacent pixel areas of a liquid crystal display according to an exemplary embodiment of the present invention. FIG. 13 is a plan view illustrating a portion of a pixel area of a liquid crystal display according to an exemplary embodiment of the present invention.

With reference to FIG. 12, the liquid crystal display according to the exemplary embodiment includes a first pixel PX1 and a second pixel PX2 disposed adjacent to each other. The first pixel PX1 and the second pixel PX2 have a first subpixel area PEa and a second subpixel area PEb, respectively. The first subpixel area PEa of the first pixel PX1 and the second subpixel area PEb of the second pixel PX2 are disposed adjacent to each other in the two adjacent pixels PX1 and PX2 of the liquid crystal display. The interval between the first subpixel area PEa and the second subpixel area PEb may be narrow. Likewise, in the case where the interval between the two pixel areas adjacent to each other is narrow, the cutout disposed at the edge of the pixel area disposed in the adjacent portion may be omitted or the width thereof may be smaller than that of the cutout disposed on another edge.

In this regard, a detailed description will be given with reference to FIG. 13.

With reference to FIG. 13, in the case where the interval between the two pixel areas adjacent to each other is narrower than the interval with another pixel area, the width of the cutout disposed at the edge of the pixel area disposed in the adjacent portion may be formed differently. FIG. 13, subfigure (a), illustrates a case where the widths d1 of the cutouts formed along the edge of the pixel area are the same. FIG. 13, subfigure (b), illustrates a case where the cutout is not formed at the edge close to the adjacent pixel area if the interval between the adjacent pixel areas is narrower than a reference threshold. FIG. 13, subfigure (c), illustrates a case where the width d2 the cutout disposed at the edge close to the adjacent pixel area is smaller than the width d1 of the cutout disposed at another edge if the interval between the adjacent pixel areas is narrower than a reference threshold in the cutout formed along the edge of the pixel area. Likewise, the width of the cutout disposed along the edge of the pixel area may be controlled based on the interval with the adjacent pixel area.

Figure 14:
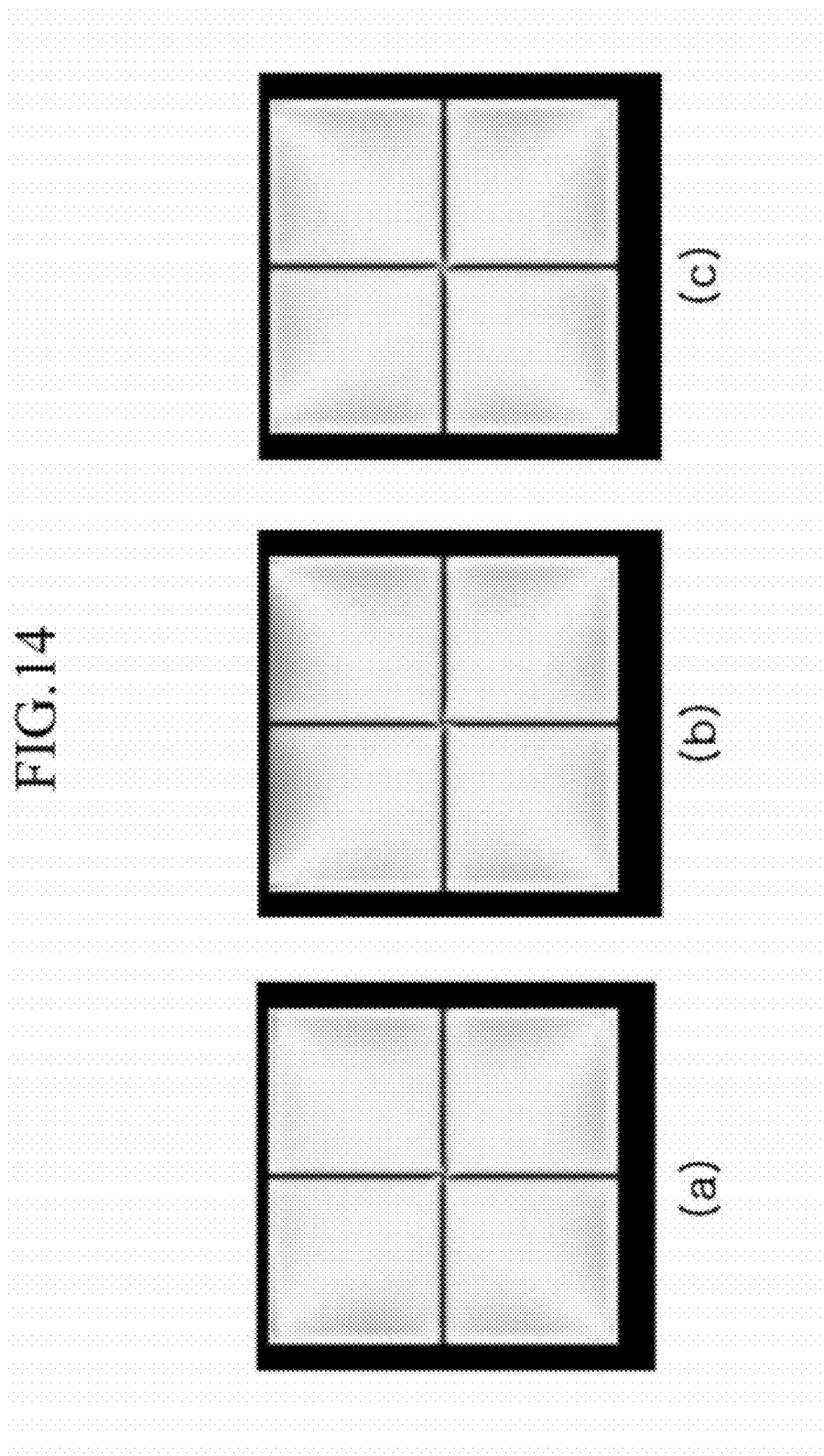
FIG. 14 is a plan view illustrating a result of transmittance of a liquid crystal display according to an exemplary embodiment of the present invention.

Transmittance of the pixel area according to an exemplary embodiment of the present invention will be described with reference to FIG. 14. FIG. 14 is a plan view illustrating a result of transmittance of a liquid crystal display according to an exemplary embodiment of the present invention.

Referring to FIG. 14, like the liquid crystal display according to the exemplary embodiment described with reference to FIG. 12 and FIG. 13, the transmittance may be measured after the same voltage is applied in a case (a) where the widths of the cutouts formed along the edge of the pixel area are the same if the interval between the adjacent pixel areas is narrower below a reference threshold, in a case (b) where the cutout is not formed at the edge close to the adjacent pixel area, and in a case (c) where the width of the cutout disposed at the edge close to the adjacent pixel area is smaller than the width of the cutout disposed at another edge. The results of the transmittance in these cases are illustrated in FIG. 14. The conditions other than the shape of the cutout disposed in the pixel area were the same as each other for all cases.

With reference to FIG. 14, as compared to the case (a) where the widths of the cutouts formed along the edge of the pixel area were similar or the same if the interval between the adjacent pixel areas was narrower below a reference threshold, it could be seen that a change in transmittance was not large even in the case (b) where the cutout was not formed at the edge close to the adjacent pixel area and in the case (c) where the width of the cutout disposed at the edge close to the adjacent pixel area was smaller than the width of the cutout disposed at another edge. Likewise, in the case of the liquid crystal display according to the exemplary embodiment of the present invention, it can be seen that excellent transmittance may be ensured even though the width of the cutout disposed at the edge of the pixel area is changed according to the condition.

A liquid crystal display according to another exemplary embodiment of the present invention will be described. The shape of the pixel electrode disposed in the pixel area of the liquid crystal display according to the exemplary embodiment may be variously changed. Specifically, the change is feasible within a range of about 1:1 to about 1:3 of a ratio of a width to a length of the pixel electrode. To be more specific, the ratio of the width to the length of the pixel electrode may be about 1:1, about 1:1.3, about 1:1.5, or about 1:2, and may be changed according to the condition of the liquid crystal display.

Transmittance of a pixel area according to an exemplary embodiment of the present invention will be described with reference to FIG. 15 and Table 1. FIG. 15 is a plan view illustrating a result of transmittance of a liquid crystal display according to an exemplary embodiment of the present invention. Table 1 shows the result of transmittance.

Referring to FIG. 15, the transmittance may be measured if the same voltage is applied in the cases (a, b, c, and d) where the ratios of the width to the length of the pixel area are about 1:1, about 1:1.3, about 1:1.5, and about 1:2 with the cutout having the cross shape is formed on the pixel electrode. The transmittance may be measured for the cases (e, f, g, and h) where the first cutout having the cross shape and the second cutout are formed along the edge of the pixel area like the liquid crystal display according to the exemplary embodiment of the present invention, and the results are shown in FIG. 15 and Table 1. The conditions other than the ratio of the width to the length of the pixel electrode disposed in the pixel area and the shape of the cutout were the same as each other for all cases. The cases (a and e) are the case where the ratio of the width to the length of the pixel area is about 1:1, the cases (b and f) are the case where the ratio of the width to the length of the pixel area is 1:1.3, the cases (c and g) are the case where the ratio of the width to the length of the pixel area is 1:1.5, and the cases (d and h) are the case where the ratio of the width to the length of the pixel area is about 1:2.

With reference to FIG. 15, as compared to the cases (a, b, c, and d) where the cutout having the cross shape is formed in the pixel area, in the cases (e, f, g, and h) where the first cutout having the cross shape and the second cutout are formed along the edge of the pixel area, it could be seen that the high transmittance was measured as a whole and the transmittance was high regardless of the ratio of the width to the length of the pixel area.

This will be described in more detail with reference to Table 1.

TABLE 1

| Case | Transmittance |
|---|---|
| A | 100 |
| B | 98.8 |
| C | 97.0 |
| D | 93.3 |
| E | 126.8 |
| F | 126.6 |
| G | 126.5 |
| H | 126.0 |

In Table 1, the transmittances were measured in the cases (b, c, and d) where the cutout having the cross shape is formed in the pixel area and the ratio of the width to the length of the pixel area is about 1:1.3, about 1:1.5, and about 1:2 and the cases (e, f, g, and h) where the first cutout having the cross shape and the second cutout are formed along the edge of the pixel area like the liquid crystal display according to the exemplary embodiment of the present invention. The transmittances of Table 1 is based on the transmittance (100%) in the case (a) where only the cutout having the cross shape is formed in the pixel area and the ratio of the width to the length of the pixel area is about 1:1.

With reference to FIG. 1, as shown in FIG. 15, in the cases (e, f, g, and h) where the first cutout having the cross shape and the second cutout are formed along the edge of the pixel area like the liquid crystal display according to the exemplary embodiment of the present invention, it could be seen that the high transmittance was measured as a whole and the transmittance was high regardless of the ratio of the width to the length of the pixel area.

Particularly, as compared to the case (a) where the cutout having the cross shape is formed in the pixel area and the ratio of the width to the length of the pixel area is about 1:1, it could be seen that the transmittance was decreased in the cases (b, c, and d) where the ratio of the width to the length was changed but the high transmittance was maintained even though the ratio of the width to the length of the pixel area was changed, in the cases (e, f, g, and h) where the first cutout having the cross shape and the second cutout were formed along the edge of the pixel area like the liquid crystal display according to the exemplary embodiment of the present invention.

Likewise, in the case of the liquid crystal display according to the exemplary embodiment of the present invention, since the high transmittance is exhibited even though the ratio of the width to the length of the pixel area is changed, it can be seen that the ratio of the width to the length of the pixel area may be variously changed according to the design of the liquid crystal display.

Likewise, in the case of the liquid crystal display according to the exemplary embodiment of the present invention, a plurality of subregions having different tilt directions of liquid crystals may be formed while the pixel electrode does not have a plurality of branched electrodes, such that a viewing angle of the liquid crystal display may be broadened, a response speed of the liquid crystal molecules may be increased by aligning the liquid crystal molecules so as to be arranged in a predetermined direction, and visibility, an open ratio, and transmittance may be increased by dividing the pixel electrode into two electrodes and applying different voltages thereto.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line disposed on the first substrate;
a pixel electrode disposed on the first substrate;
a first alignment layer disposed on the first substrate and the pixel electrode;
a second substrate facing the first substrate;
a common electrode disposed on the second substrate;
a second alignment layer disposed on the second substrate and the common electrode; and a liquid crystal layer disposed between the first substrate and the second substrate;

wherein:
the common electrode has a first opening having a cross shape comprising a horizontal portion substantially parallel to the gate line and a vertical portion substantially vertical to the gate line,
an edge of the first opening protrudes beyond edges of the pixel electrode when viewed in plan view,
the pixel electrode has a second opening disposed adjacently to at least one of the edges of the pixel electrode, and
the second opening does not overlap the first opening when viewed in plan view.

2. The liquid crystal display of claim 1, wherein:
the second opening is disposed to be spaced apart from the edge of the pixel electrode by at most two times a thickness of the liquid crystal layer, and a width of the second opening at most two times the thickness of the liquid crystal layer.

3. The liquid crystal display of claim 2, wherein:
a width of the first opening is at most three times the thickness of the liquid crystal layer.

4. The liquid crystal display of claim 3, wherein:
at least one of the liquid crystal layer, the first alignment layer, and the second alignment layer comprises a photoreactive material.

5. The liquid crystal display of claim 4, wherein:
liquid crystal molecules of the liquid crystal layer are aligned vertically to surfaces of the first substrate and the second substrate if an electric field is not applied to the liquid crystal layer.

6. The liquid crystal display of claim 5, wherein:
the liquid crystal molecules of the liquid crystal layer are arranged in parallel to have a pretilt in a direction toward a central portion of the first opening from the edges of the pixel electrode.

7. The liquid crystal display of claim 5, wherein:
the pixel electrode is divided into a plurality of subregions by the edge of the pixel electrode and the first opening, and
in each of the subregions, the liquid crystal molecules of the liquid crystal layer are arranged so as to have pretilts in different directions.

8. The liquid crystal display of claim 1, wherein:
a width of the first opening is at most three times the thickness of the liquid crystal layer.

9. The liquid crystal display of claim 8, wherein:
at least one of the liquid crystal layer, the first alignment layer, and the second alignment layer comprises a photoreactive material.

10. The liquid crystal display of claim 9, wherein:
liquid crystal molecules of the liquid crystal layer are aligned vertically to surfaces of the first substrate and the second substrate if an electric field is not applied to the liquid crystal layer.

11. The liquid crystal display of claim 10, wherein:
the liquid crystal molecules of the liquid crystal layer are arranged in parallel to have a pretilt in a direction toward a central portion of the first opening from the edges of the pixel electrode.

12. The liquid crystal display of claim 10, wherein:
the pixel electrode is divided into a plurality of subregions by the edge of the pixel electrode and the first opening, and
in each of the subregions, the liquid crystal molecules of the liquid crystal layer are arranged so as to have pretilts in different directions.

13. The liquid crystal display of claim 1, wherein:
at least one of the liquid crystal layer, the first alignment layer, and the second alignment layer comprises a photoreactive material.

14. The liquid crystal display of claim 13, wherein:
liquid crystal molecules of the liquid crystal layer are aligned vertically to surfaces of the first substrate and the second substrate if an electric field is not applied to the liquid crystal layer.

15. The liquid crystal display of claim 14, wherein:
the liquid crystal molecules of the liquid crystal layer are arranged in parallel to have a pretilt in a direction toward a central portion of the first opening from the edges of the pixel electrode.

16. The liquid crystal display of claim 14, wherein:
the pixel electrode is divided into a plurality of subregions by the edge of the pixel electrode and the first opening, and
in each of the subregions, the liquid crystal molecules of the liquid crystal layer are arranged so as to have pretilts in different directions.

17. The liquid crystal display of claim 1, wherein:
liquid crystal molecules of the liquid crystal layer are aligned vertically to surfaces of the first substrate and the second substrate if an electric field is not applied to the liquid crystal layer.

18. The liquid crystal display of claim 17, wherein:
the liquid crystal molecules of the liquid crystal layer are arranged in parallel to have a pretilt in a direction toward a central portion of the first opening from the edges of the pixel electrode.

19. The liquid crystal display of claim 17, wherein:
the pixel electrode is divided into a plurality of subregions by the edge of the pixel electrode and the first opening, and
in each of the subregions, the liquid crystal molecules of the liquid crystal layer are arranged so as to have pretilts in different directions.

20. The liquid crystal display of claim 1, wherein:
the liquid crystal molecules of the liquid crystal layer are arranged in parallel to have a pretilt in a direction toward a central portion of the first opening from the edges of the pixel electrode.

21. The liquid crystal display of claim 1, wherein:
the pixel electrode is divided into a plurality of subregions by the edge of the pixel electrode and the first opening, and
in each of the subregions, the liquid crystal molecules of the liquid crystal layer are arranged so as to have pretilts in different directions.

22. A liquid crystal display, comprising:
a first substrate;
a gate line disposed on the first substrate;
a pixel electrode disposed on the first substrate;
a common electrode disposed on the second substrate; and
a liquid crystal layer disposed between the first substrate and the second substrate;

wherein:
the common electrode has a first opening dividing the pixel electrode into a plurality of regions when viewed in plan view,
the first opening comprises a horizontal portion substantially parallel to the gate line and a vertical portion substantially vertical to the gate line, a portion of the first opening meets an edge of the pixel electrode,
the pixel electrode has a second opening disposed at the edges of the pixel electrode, and
the second opening does not overlap the first opening when viewed in plan view.

\* \* \* \* \*